United States Patent [19]

Andrews et al.

[11] Patent Number: 4,859,889
[45] Date of Patent: Aug. 22, 1989

[54] DYNAMOELECTRIC MACHINE

[75] Inventors: Loren E. Andrews, Gallatin, Tenn.; Robert L. Sieber, Ft. Wayne, Ind.

[73] Assignee: General Electric Company, Fort Wayne, Ind.

[21] Appl. No.: 212,604

[22] Filed: Jun. 28, 1988

[51] Int. Cl.⁴ ............................................. H02K 5/00
[52] U.S. Cl. ...................................... 310/89; 310/42; 310/91; 310/258
[58] Field of Search ................. 310/89, 91, 258, 42, 310/254; 248/674, 675

[56] References Cited

U.S. PATENT DOCUMENTS

| | | | |
|---|---|---|---|
| 1,771,457 | 7/1930 | Wright . | |
| 2,389,900 | 1/1945 | DeLancey | 172/36 |
| 2,650,316 | 8/1953 | Johns et al. | 310/258 |
| 2,717,967 | 9/1955 | Turner | 310/76 |
| 3,321,654 | 5/1967 | Allendorph | 310/258 |
| 3,375,382 | 3/1968 | Barber et al. | 310/42 |
| 3,501,660 | 3/1970 | Wightman et al. | 310/91 |
| 3,870,909 | 3/1975 | Button et al. | 310/91 |
| 4,110,644 | 8/1978 | Roddy | 310/91 |
| 4,134,036 | 1/1979 | Curtiss | 310/42 |
| 4,170,057 | 10/1979 | Roddy et al. | 29/596 |
| 4,207,484 | 6/1980 | Krecker | 248/674 |
| 4,593,163 | 6/1986 | Fisher et al. | 200/80 R |
| 4,739,206 | 4/1988 | Sieber | 310/91 |

FOREIGN PATENT DOCUMENTS

| | | | |
|---|---|---|---|
| 0185873 | 6/1956 | Austria | 310/91 |
| 0885749 | 6/1953 | Fed. Rep. of Germany | 310/91 |
| 2327525 | 12/1974 | Fed. Rep. of Germany | 310/91 |
| 0366001 | 12/1938 | Italy | 310/42 |
| 1000252 | 8/1965 | United Kingdom | 310/91 |

Primary Examiner—R. Skudy
Attorney, Agent, or Firm—Ralph E. Krisher, Jr.

[57] ABSTRACT

A dynamoelectric machine has a housing with generally axially extending radially spaced apart inner and outer circumferential surfaces with a generally annular external rabbet in said outer circumferential surface. An end frame is arranged in a preselected assembly position on the housing and has a generally annular internal rabbet received generally in mating engagement about the external rabbet when the end frame is in its preselected assembly position.

15 Claims, 4 Drawing Sheets

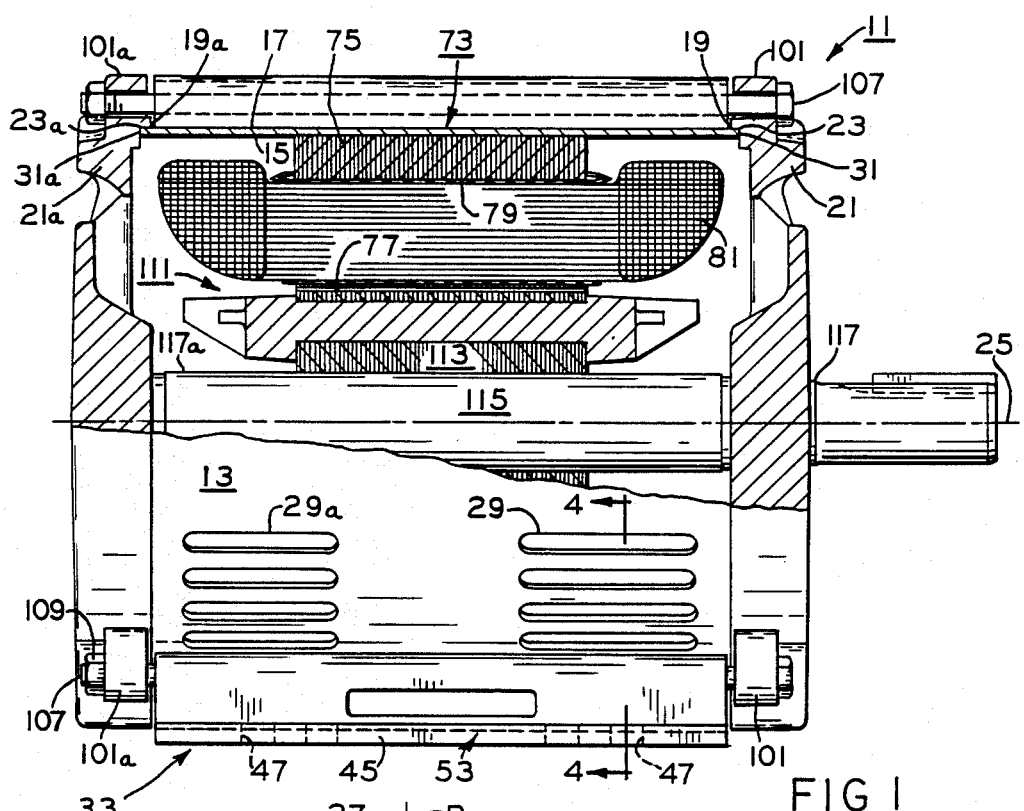
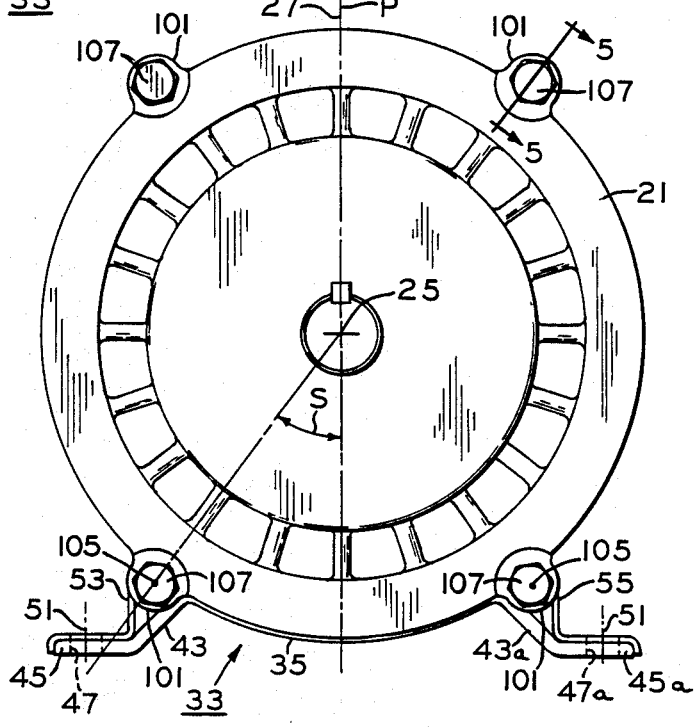

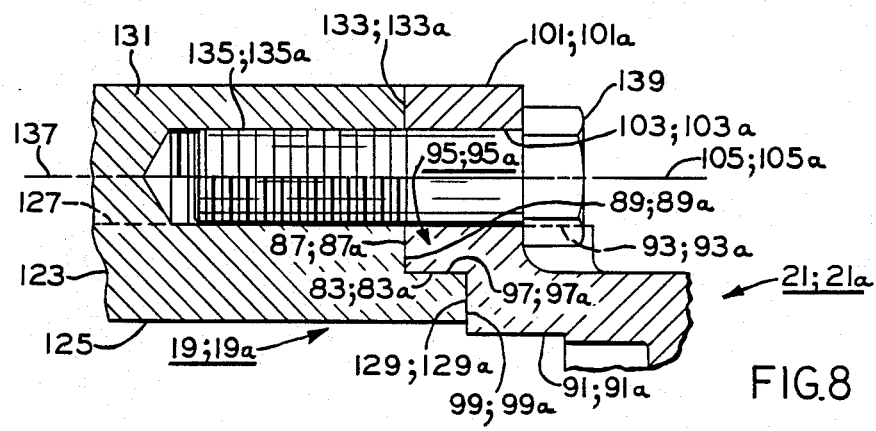
FIG. 8
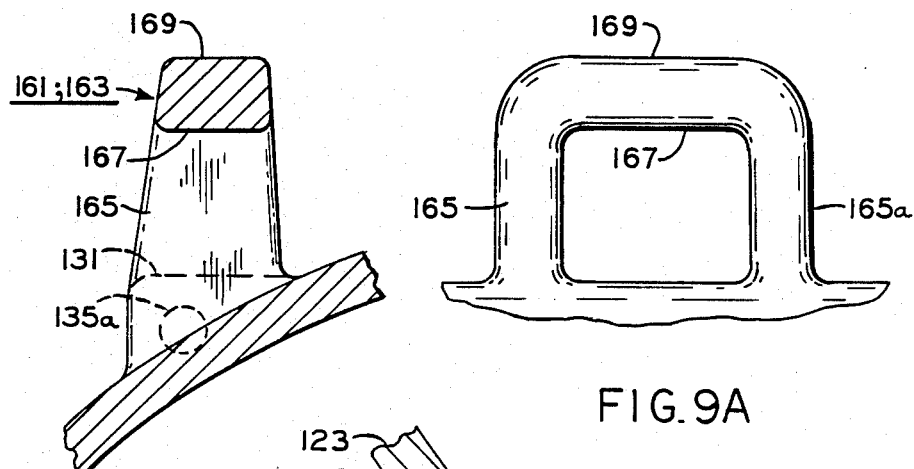
FIG. 9
FIG. 9A
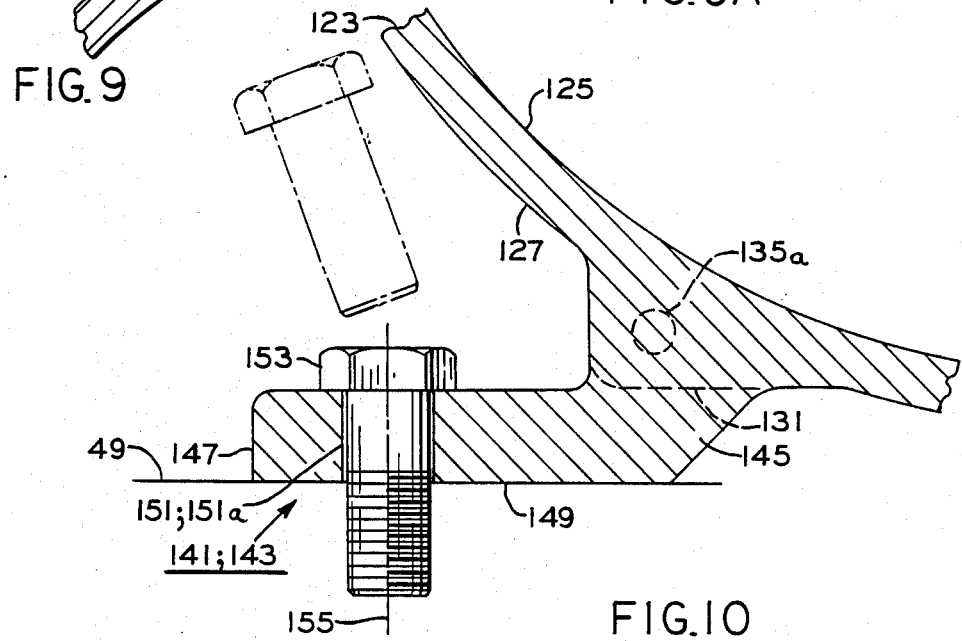
FIG. 10

DYNAMOELECTRIC MACHINE

FIELD OF THE INVENTION

This invention relates in general to electrical apparatus and in particular to a dynamoelectric machine.

BACKGROUND OF THE INVENTION

In the past, dynamoelectric machines, such as an electric motor or the like, were provided with various different types of housings, such as for instance a rolled steel housing or a cast metallic housing or the like, and each such housing had generally axially extending radially spaced apart inner and outer circumferential surfaces with a pair of generally opposite end faces interposed therebetween, respectively. During the assembly of the past electric motors, a stator assembly including windings was mounted to the housing within its inner circumferential surface by suitable means, such as for instance pressing the stator assembly into a press-fit engagement with the inner circumferential surface. When the stator assembly was press-fitted into a rolled steel housing, it is believed that distortion occurred which necessitated corrective machining for concentricity purposes; however, when the stator assembly was press-fitted into a cast housing, it is believed that such corrective machining thereof was necessary for concentricity purposes whether or not the cast housing was deformed. Therefore, past practice was to chuck the stator assembly on a bore extending therethrough and then machine opposite internal rabbets in the inner circumferential surface of the housing or opposite external rabbets in the outer circumferential surface of the housing with the opposite rabbets intersecting the opposite end faces on the housing. When internal rabbets were machined into the housing, it is believed that some of the metal chips formed during the machining of the internal rabbets in the inner circumferential surface of the housing may have lodged in the windings of the stator assembly, and it is also believed that such lodged chips may have contributed to short circuiting of such windings.

Further with respect to the past practices, various national and international regulatory agencies, such as NEMA and Underwriters Laboratories, Inc. in the U.S.A. and the International Electrical Commission (hereinafter referred to as IEC) for instance, have established dimensional and electrical standards for different types of electrical apparatus. In the field of electric motors, both NEMA and IEC have established standard frame sizes with each such frame size having certain standardized dimensions and with the IEC standardized dimensions being on the metric scale. For instance, an electric motor of any given frame size would have at least the following standardized dimensions: a "shaft height" dimension, i.e., the vertical distance between the centerline axis of the motor shaft and the base or seating surface of the motor mounting pads; an "A" dimension, i.e., the horizontal distance between the centerline axes of the mounting bolt holes in the opposite motor mounting pads; and a "B" dimension, i.e., the horizontal distance between the centerline axes of the mounting bolt holes in either one of the mounting pads. Furthermore, the mounting bolts utilized to mount electric motors of a given frame size have also been provided by NEMA and IEC with standardized diameter dimensions.

Of course, the standardization by NEMA of the mounting bolt diameters and the "A" and "B" dimensions for given frame sizes of electric motors was advantageous from the viewpoint of interchanging electric motors of different electric motor manufacturers. For instance, the aforementioned standardization of the mounting bolt diameters and the "A" and "B" dimensions made it possible for a user in the U.S.A. of electric motors to provide identical mounting arrangements to receive or mount an electric motor of a given frame size manufactured by many different domestic electric motor manufacturers. Of course, the same may be said for a user and manufacturers of electric motors in various other countries which have adapted the IEC standardized dimensions.

In order to maximize the horsepower rating of an electric motor of a given frame size, it is advantageous to provide the electric motor housing with an outside diameter which is as large as possible and which is limited by the aforementioned standardized shaft height dimension for such given frame size. Of course, the greater the outside diameter, the greater the inside diameter thereby to accept a larger diameter stator which results in an increased horsepower rating. Of course, the horsepower rating may also be increased by "stacking-out" the stator, i.e., increasing the axial length of the stator; however, when a "symmetrical" electric motor is desired, it is well known to the art that the stator cannot be "stacked-out".

While it is advantageous to increase the outside diameter of the housing for an electric motor of a given frame size, as discussed above, it is believed that mounting problems may have been encountered when external mounting flanges were formed on either such housing or end frames for securement thereto. For instance, it is believed that the aforementioned larger outside diameter of the electric motor housing and the location of the external mounting flanges may have deleteriously interfered with the insertion of a standard mounting bolt through mounting holes provided on the aforementioned standardized "A" and "B" dimensions in the mounting pads of such electric motors.

SUMMARY OF THE INVENTION

Among the several objects of the present invention may be noted the provision of an improved dynamoelectric machine which overcomes the above-discussed disadvantageous or undesirable features, as well as others, of the prior art; the provision of such improved dynamoelectric machine having a housing with a mounting arrangement, such as a mounting bracket or mounting pads, which provide a plurality of different arrays of mounting bolt holes for different given frame sizes of such dynamoelectric machine; the provision of such improved dynamoelectric machine in which such arrays of mounting bolt-holes accommodate both the NEMA and IEC standardized dimensions therefor; the provision of such improved dynamoelectric machine in which the bolt holes are predeterminately oversized to accommodate the NEMA and IEC standardized mounting dimensions; the provision of such improved dynamoelectric machine wherein a pair of opposite end frames are secured to the housing with at least one of the housing and end frames having four generally radially extending mounting or assembling flanges which are predeterminately located to obviate interference with the passage of a standard mounting bolt through the mounting bolt holes therefor in the mounting pads for such dynamoelectric machine upon the mounting of the dynamoelectric machine to a support therefor; the provision of such improved dynamoelectric machine in which each of the mounting flanges has an opening on a centerline axis radially spaced generally about thirty seven and one half degrees (37° 30′) from an imaginary plane defining a vertical axis of the dynamoelectric machine and passing through a horizontal centerline axis of the dynamoelectric machine; the provision of such improved dynamoelectric machine wherein the opposite mounting pads are either integrally formed with the housing or provided on a mounting bracket or base attached to the housing; the provision of such improved dynamoelectric machine wherein the housing and the mounting base are provided with a plurality of arrays of openings therethrough which are at least in part disposed in overlaying or overlapping relation with tack welds interconnecting the housing and mounting base through selected ones of the openings therein; the provision of such improved dynamoelectric machine wherein the opposite mounting pads extend in part generally angularly from the outer circumferential surface of the housing at least adjacent two of the mounting flanges at least when the end frame is in its preselected assembly position and also in part in oppositely spaced perpendicular relation with the vertical axis of the dynamoelectric machine; the provision of such improved dynamoelectric machine wherein the mounting pads are blended in shape with the two assembly flanges when the mounting pads are integrally formed with the housing; the provision of such improved dynamoelectric machine having a pair of lifting lugs integrally formed with said housing so as to extend from two other adjacent mounting flanges and generally in oppositely spaced parallel relation with the vertical axis of the dynamoelectric machine; and the provision of such improved dynamoelectric machine having component parts which are simple in design, economically manufactured and easily assembled. These objects, as well as other objects and advantageous features, of the present invention will be in part apparent and in part pointed out hereinafter.

In general and in one form of the invention, a dynamoelectric machine is provided with a housing having a horizontal centerline axis with an imaginary plane passing therethrough to define a vertical axis of the dynamoelectric machine. The housing includes generally axially extending spaced apart first inner and outer circumferential surfaces arranged generally coaxially about the horizontal centerline axis, at least one end face between the first inner and outer circumferential surfaces, and an external rabbet in the first outer circumferential surface intersecting the at least one end face. A stator assembly is disposed within the first inner circumferential surface, and a rotatable assembly is associated with the stator assembly. At least one end frame means is arranged in a preselected assembly position on the housing for rotatably supporting a part of the rotatable assembly, and second inner and outer circumferential surfaces on the at least one end frame means are arranged generally in axially extending radially spaced apart relation. Another end face on the at least one end frame means is disposed between the second inner and outer circumferential surfaces, and an internal rabbet is provided in the second inner circumferential surface intersecting the another end face and disposed in engagement about the external rabbet when the at least one end frame means is in its preselected assembly position. Four flanges are integral with the second outer circumferential surface, and each flange has an aperture therein with a centerline axis radially spaced about the horizontal centerline axis generally about thirty seven and one half degrees (37° 30′) from the vertical axis when the at least one end frame means is in its preselected assembly position. A set of means are respectively engaged with the four flanges and extend through the apertures for releasably maintaining the at least one end frame means against displacement from its preselected assembly position.

Also in general and in one form of the invention, a dynamoelectric machine has a housing with a horizontal centerline axis, and an imaginary plane passes through the centerline axis to define a vertical axis of the housing. Generally axially extending radially spaced apart inner and outer circumferential surfaces are provided on the housing generally coaxial with the horizontal centerline axis, and a pair of generally opposite end faces on the housing are disposed between the inner and outer circumferential surfaces. The outer circumferential surface includes at least four flanges extending generally axially between the opposite end faces, and each of the flanges has a pair of generally axially opposite apertures with each aperture having another centerline axis radially spaced about the horizontal centerline axis thirty seven and one half degrees (37° 30′) from the vertical axis.

BRIEF DESCRIPTION OF THE DRAWINGS

FIG. 1 is a partial sectional view showing a dynamoelectric machine in one form of the invention partially in cross-section;

FIG. 2 is a right side elevational view of the dynamoelectric machine in FIG. 1;

FIG. 8 is an enlarged fragmentary view taken from FIG. 6 and compositely illustrating the mounting association of the end frames of the alternative dynamoelectric machine with the housing thereof;

FIG. 9 is an enlarged sectional view taken along line 9—9 in FIG. 7;

FIG. 9A is a left side elevational view of the lifting lug of FIG. 7; and

FIG. 10 is an enlarged sectional view taken along line 10—10 in FIG. 6.

Corresponding reference characters indicate corresponding parts throughout the several views of the drawings.

The exemplifications set out herein illustrate the preferred embodiment of the present invention in one form thereof and such exemplifications are not to be construed as limiting either the scope of the invention or the scope of the disclosure thereof in any manner.

DETAILED DESCRIPTION OF THE PREFERRED EMBODIMENT

Figure 4:
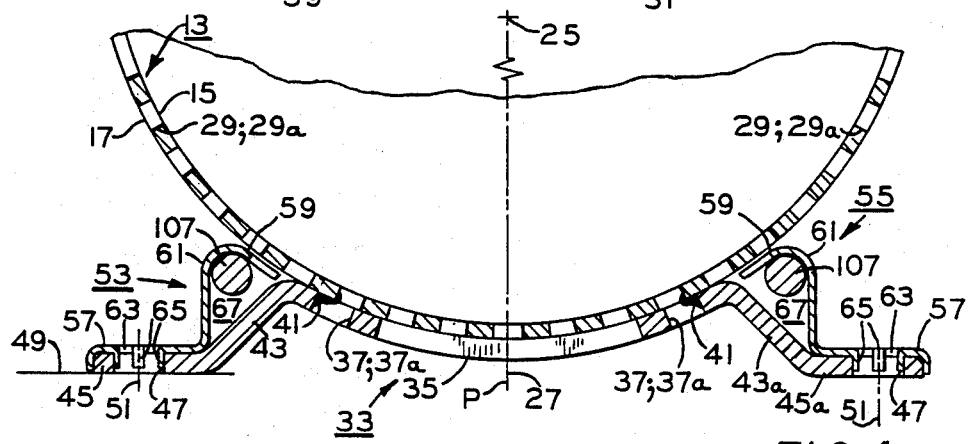
FIG. 4 is an enlarged sectional view taken along line 4—4 in FIG. 1 with some components of the dynamoelectric machine omitted for the take of drawing simplification.
Figure 5:
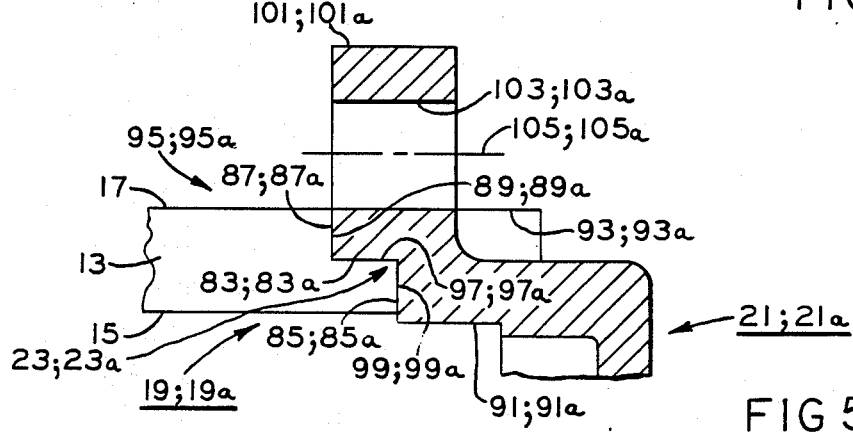
FIG. 5 is an enlarged sectional view taken along line 5—5 in FIG. 2 and compositely illustrating the mounting association of the end frames of the dynamoelectric machine with the housing thereof.

Referring now to the drawings in general, there is illustrated in one form of the invention a dynamoelectric machine, such as for instance an electric motor 11 or the like, having a housing or casing 13 with generally axially extending radially spaced apart inner and outer circumferential surfaces 15, 17 (FIGS. 1, 4 and 5). A pair of generally circumferential or annular opposite external rabbets or groove means 19, 19a are provided in axially spaced apart relation in outer circumferential surface 17 for receiving a pair of opposed end frames or end frame means 21, 21a in preselected assembly positions on housing 13, and a pair of generally circumferential or annular opposed internal rabbets or groove means 23, 23a on the end frames are seated in mating engagement generally circumferential about the external rabbets on the housing, respectively (FIGS. 1 and 5).

More particularly and with specific reference to FIGS. 1-5, inner and outer circumferential surfaces 15, 17 of housing 13 are predeterminately spaced about a horizontal centerline axis 25 of electric motor 11, and an imaginary plane P passing through the centerline axis defines a vertical axis 27 of the electric motor, as best seen in FIG. 2. Housing 13 may be formed of any suitable sheet material having the desired physical characteristics, such as for instance sheet steel or the like, which may be rolled and welded (not shown) to provide the generally cylindric or tubular sleeve configuration of the housing, as well known to the art. As best seen in FIGS. 1 and 4, a pair of arrays of radially spaced apart apertures or slots 29, 29a intersect inner and outer circumferential surfaces 15, 17 and are spaced adjacent a pair of opposite ends or end portions 31, 31a of housing 13. As discussed in greater detail hereinafter, housing slots 29, 29a are provided not only for the passage of cooling air through electric motor 11 but also for the convenience of assembling other components of the electric motor to housing 13 by suitable means, such as for instance spot or tack welding or the like.

Figure 3:
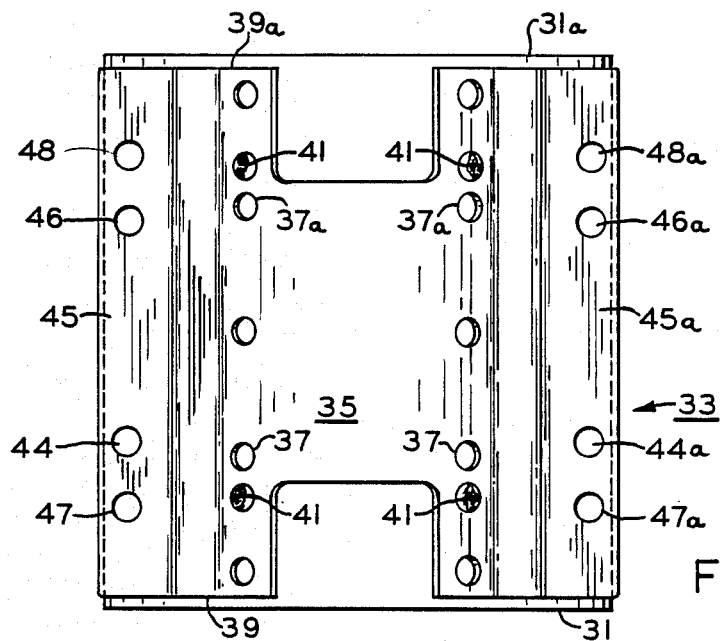
FIG. 3 is a bottom elevational view of a dynamoelectric machine in FIG. 1.

A mounting bracket or base 33 for electric motor 11 is arranged in a preselected assembly position on housing 13 so as to extend generally symmetrically about vertical axis 27 and lengthwise of the housing between opposite ends 31, 31a thereof, and the mounting base may be formed of any suitable sheet material having the desired physical characteristics, such as for instance a sheet steel or the like, as best seen in FIGS. 1-4. A generally bowed or arcuately shaped central section 35 of mounting base 33 conforms generally to the configuration of outer circumferential surfaces 17 of housing 13 against which the bowed central section is seated or engaged in abutment, and a plurality of generally radially spaced apart apertures 37, 37a are provided through the bowed central section adjacent a pair of opposite ends 31, 31a of the housing, as best seen in FIG. 3. When mounting base 33 is arranged in its preselected assembly position on housing 13, it may be noted that apertures 37, 37a in bowed central section 35 of mounting base 33 are disposed in overlapping or overlaying arrangement with slots 29, 29a in housing 13, and a plurality of tack welds indicated at 41 are provided within at least some of the overlapping apertures and slots between the bowed central section and the housing thereby to maintain or releasably retain the mounting base in its preselected assembly position. A pair of generally opposite legs 43, 43a are integrally formed with bowed central section 35 so as to extend generally angularly or radially outwardly from outer circumferential surface 17 of housing 13, and the opposite legs terminate in a pair of generally opposite mounting pads or feet 45, 45a which extend generally perpendicular to vertical axis 27, respectively. Opposite mounting pads 45, 45a are respectively provided with a plurality of opposite openings or apertures, such as for instance bolt-holes 44, 44a, 46, 46a, 47, 47a, 48, 48a, which are adapted to receive mounting bolts (not shown) for securing electric motor 11 to a support therefor indicated at 49 so as to define a base line reference of the electric motor. For the sake of drawing simplification, tack welds 41 are shown only between housing slots 29 and mounting base apertures 37; however, in FIG. 4, both opposite housing slots 29, 29a and both opposite mounting base apertures 37, 37a are compositely identified.

As previously mentioned, both NEMA and IEC have established certain standard frame sizes for electric motors, and each such frame size has a standard shaft height dimension and standard A and B mounting dimensions. It may be noted that a plurality of arrays of bolt-holes have been provided in opposite mounting pads 45, 45a of mounting base 33 for different given frame sizes of electric motor 11. Thus, when mounting base 33 is associated with electric motor 11 of one given frame size, bolt-holes 44, 44a, 47, 47a, 48, 48a may be utilized to receive a standard bolt (not shown) for effecting the mounting of the mounting base to support 49 therefor, and when the mounting base 33 is associated with the electric motor 11 of another different given frame size, bolt-holes 46, 46a, 47, 47a, 48, 48a may be utilized to receive such standard bolt for effecting the mounting of the mounting base to support 49 therefor. Each bolt-hole in the aforementioned different arrays thereof has a centerline axis 51 spaced by such standard A and B mounting dimensions from the other bolt-holes in a given one of such bolt-hole arrays, and the centerline axes 51 are arranged generally in parallel spaced apart relation from vertical axis 27. Albeit not shown for the purpose of drawing simplification, the diameters of bolt-holes 44, 44a, 46, 46a, 47, 47a, 48, 48a are predeterminately oversized wherein the mounting arrangement of electric motor 11 not only accommodates both the NEMA and IEC standard A and B mounting dimensions, which are of course very nearly the same, but also accepts the NEMA and IEC different standard diameter dimensions of mounting bolts received in such bolt-holes for effecting the mounting of mounting base 33 to support 49 therefor.

While mounting base 33 is illustrated herein for purposes of disclosure, it is contemplated that other mounting bases having similar mounting bolt-hole arrays with different A and B mounting dimensions may be similarly secured in the aforementioned preselected assembly position to housing 13 within the scope of the invention so as to meet at least some of the objects thereof. For instance and in this vein, it is contemplated that mounting base 33 may be disassembled from housing 13 by breaking tack welds 41 therebetween and that a replacement mounting base (not shown) may be similarly tack welded to the housing to increase the shaft height dimension of electric motor 11 which is, of course, measured along vertical axis 27 between centerline axis 25 and reference base line 49 of the electric motor. Thus, it may be noted that electric motor 11 may be easily and readily converted from one given standard frame size to another given standard frame size by merely interchanging mounting bases in the manner discussed above.

If desired, a pair of generally opposed covers 53, 55 may be disposed in preselected assembly positions between housing 13 and mounting base 33 so as to extend in overlaying relation with opposite legs 41, 41a and opposite pads 43, 43a of the mounting bases generally lengthwise between opposite ends 39, 39a thereof, as best seen in FIGS. 1 and 4. Opposed covers 53, 55 each have a pair of opposite sides or side portions 57, 59 with an arcuate section 61 interposed therebetween. When covers 53, 55 are in their preselected assembly positions, each opposite side portion 59 is disposed at least adjacent outer circumferential surface 17 of housing 13 in overlaying relation therewith, and each opposite side portion 57 is disposed in overlaying engagement with pads 45, 45a of mounting base 33. A plurality of openings 63 in each opposite side portion 57 are provided generally in coaxial relation about centerline axes 51 of bolt-holes 47, 47a in opposite mounting pads 45, 45a, and if desired, a set of retaining means, such as for instance prongs 65 or the like, integral with each opposite side potion 57 about openings 63 may be extended into interfering fitting engagement with such openings to releasably retain covers 53, 55 against displacement from their preselected assembly position at least during the assembly of electric motor 11. Thus, each arcuate section 61 of opposed covers 53, 55 defines in part with mounting base 33 a through-bolt receiving channel 67 across the mounting base between opposite ends 39, 39a thereof. While prongs 65 are shown herein in releasable retaining engagement within bolt-holes 47, 47a of mounting pads 45, 45a for purposes of disclosure, it is contemplated that other securing means, such as for instance spot welding or other mechanical interfering engaging parts, may be utilized to retain covers 53, 55 in their preselected assembly positions within the scope of the invention so as to meet at least some of the objects thereof. Covers 53, 55 may be formed of any suitable material having the desired physical characteristics, such as for instance a sheet steel or a resin material or the like.

A stator assembly 73 is secured against displacement to housing 13 within inner circumferential surface 15 thereof by suitable means, such as for instance a press-fit or the like, as best seen in FIG. 1. Stator assembly 73 includes a ferromagnetic material core 75 having a bore 77 and a plurality of winding receiving slots 79 extending generally axially therethrough, and a winding or winding means 81 disposed in part within such winding slots 79 is adapted to be excited upon the energization of electric motor 11. Albeit not shown for the sake of brevity of disclosure and drawing simplification, leads of winding means 81 may be passed therefrom through an opening in housing 13 into a conduit box secured thereto in a manner well known to the art. When stator assembly 73 is press-fitted into housing 13, as mentioned above, the peripheral surface of core 75 is press-fitted into displacement preventing engagement with inner circumferential surface 15 of the housing so that bore 77 is generally axially aligned with horizontal centerline axis 25 of electric motor 11; however, it is believed that the press-fit of the core within the inner circumferential surface may be of such magnitude to result in a slight deformation of the housing causing at least opposite end portions 31, 31a thereof to become out-of-round. To correct this deformation of housing 13, it is necessary to machine external rabbets 19, 19a in opposite end portions 13, 31a of the housing for concentricity purposes so that opposite end frame 21, 21a may be concentrically located with respect to horizontal centerline axis 25 of electric motor 11, as further discussed hereinafter.

To effect the aforementioned machining of external rabbets 19, 19a in opposite end portions 31, 31a of housing 13, bore 77 of core 75 may be chucked on suitable apparatus, such as for instance a lathe (not shown) or the like, with at least the assembled housing, mounting base 33 and stator assembly 73 being conjointly rotated while a cutting tool (not shown) is operated to cut or machine the external rabbets in outer circumferential surface 17 in the opposite end portions of the housing. Since external rabbets 19, 19a are machined in outer circumferential surface 17 of housing 13, windings 81 of stator assembly 73 within inner circumferential surface 15 of the housing may be shielded by such housing against contact or contamination with metallic chips (not shown) generated during the machining of the external rabbets. Of course, the aforementioned apparatus for machine external rabbets 19, 19a in housing 13 forms no part of this invention, and therefore, such apparatus is not disclosed for purposes of brevity of disclosure and drawing simplification. Also, since external rabbets 19, 19a and end frames 21, 21a are each of like construction, only external rabbet 19 and end frame 21 will be further described with like parts of external rabbet 19a and end frame 21a being designated by the letter "a" for the sake of brevity of disclosure and drawing simplification.

As previously mentioned, external rabbets 19, 19a are formed in opposite facing relation in opposite end portions 31, 31a of housing 13. External rabbets 19, 19a have a pair of generally annular base walls 83, 83a radially spaced between inner and outer circumferential surfaces 15, 17 of housing 13, and a pair of opposite end faces 85, 85a are provided on the housing intersecting the annular base walls and the inner circumferential surface, respectively, as best seen in FIG. 5. A pair of generally annular opposite sidewalls 87, 87a of external rabbets 19, 19a are interposed between base walls 83, 83a and outer circumferential surface 17 of housing 13 so as to be generally axially spaced from end faces 85, 85a, respectively.

End frames 21, 21a are each provided with end faces 89, 89a which are interposed between inner and outer circumferential surfaces 91, 93 and 91a, 93a, and internal rabbets 95, 95a are formed in the end faces between the inner and outer circumferential surfaces, respectively. Internal rabbets 95, 95a have generally annular base walls 97, 97a radially spaced between inner and outer circumferential surfaces 91, 91a and 93, 93a of end frames 21, 21a and intersecting end faces 89, 89a thereof, and generally annular sidewalls 99, 99a of the internal rabbets are interposed between the base walls and the inner circumferential surfaces so as to be axially spaced from the end faces, respectively. End frames 21, 21a are provided with four arcuately or radially spaced apart mounting lugs or flanges 101, 101a which are integral formed on outer circumferential surfaces 93, 93a so as to extend generally radially outwardly therefrom, and four through-bolt receiving openings 103, 103a are respectively provided in the lugs so as to extend generally about horizontal centerline axis 105, 105a therefor. When opposite end frames 21, 21a are disposed in the preselected assembly positions thereof on housings 13, it may be noted that each centerline axis 105, 105a for openings 103, 103a of lugs 101, 101a is angularly spaced generally about thirty seven and one-half degrees (37° 30′) about horizontal centerline axis 25 of electric motor 11 from vertical centerline axis 27 thereof, as indicated by angle S in FIG. 2 and as further discussed hereinafter.

In the assembly of opposite end frames 21, 21a with housing 13, annular base walls 97, 97a of internal rabbets 95, 95a on the opposite end frames are placed in overlaying engagement about annular base walls 83, 83a of external rabbets 19, 19a in opposite end portions 31, 31a of housing 13, and end faces 89, 89a on the end frames are disposed at least adjacent external rabbet sidewalls 87, 87a on the housing while internal rabbet sidewall 99, 99a on the end frames are engaged with end faces 85, 85a on the housing, respectively. With internal rabbets 95, 95a of opposite end frames 21, 21a so seated in engagement about external rabbets 23, 23a on housing 13, the end frames may be adjustably rotated into the preselected assembly positions thereof on the housing thereby to axially align centerline axes 105, 105a of through-bolt openings 103, 103a of mounting lugs 101, 101a, respectively. Albeit not shown, alignment indicia, such as for instance axially alignable marks or grooves or the like, may be provided on outer circumferential surface 17 of housing 13 and on outer circumferential surfaces 93, 93a of opposite end frames 21, 21a thereby to insure that the opposite end frames are located in the preselected assembly position thereof on the housing. Thus, when opposite end frames 21, 21a are so located in their preselected assembly positions on housing 13, openings 103, 103a in mounting lugs 101, 101a are not only in axial alignment with each other but also each centerline axis 105, 105a is predeterminately located so as to be angularly spaced generally about thirty seven and one-half degrees (37° 30′) about horizontal centerline axis 25 of electric motor 11 from vertical centerline axis 27 thereof. With opposite end frames 21, 21a so located in their preselected assembly positions, four through-bolts 107 may be inserted through the axially aligned lug openings 103, 103a of the opposite end frames, and a nut 109 may be threadedly engaged with each through-bolt and abutted against mounting lugs 101a on opposite end frame 21a to urge the heads of the through-bolts into engagement with mounting lugs 101 on opposite end frame 21, and in this manner, the opposite end frames are retained against displacement from the preselected assembly positions thereof on housing 13. Albeit not shown for purposes of drawing simplification and brevity of disclosure, it is contemplated that lug openings 103a in end frame 21a may be threaded so as to threadedly receive through-bolts 107 to affect the mounting of end frame 21a to housing 13 within the scope of the invention so as to meet at least some of the objects thereof. It may be noted that two of through-bolts 107 are passed through channels 67 provided therefore between opposed covers 53, 55 and mounting base 33.

Electric motor 11 is also provided with a rotatable assembly or rotatable means 111 comprising a rotor 113 generally coaxially mounted about a shaft 115 having a pair of generally opposite shaft extensions 117, 117a. Rotor 113 extends at least in part generally coaxially through bore 77 in core 75 of stator assembly 73 so as to be rotatable in magnetic coupling relation with windings 81 upon the excitation thereof when electric motor 11 is energized across a power source (not shown), and opposite shaft extensions 117, 117a are rotatably supported in opposite end frames 21, 21a by suitable means, such as for instance bearings (not shown) or the like.

An alternative dynamoelectric machine, such as for instance electric motor 121 or the like, is shown in one form of the invention in FIGS. 6–10 having generally the same component parts assembled together generally in the same manner as those of the above discussed electric motor 11 with the exceptions noted hereinafter, and while electric motor 121 meets at least some of the objects set out herein, it is believed that electric motor 121 has indigenous objects and advantageous features which will be in part apparent and in part pointed out in the following discussion.

Figure 6:
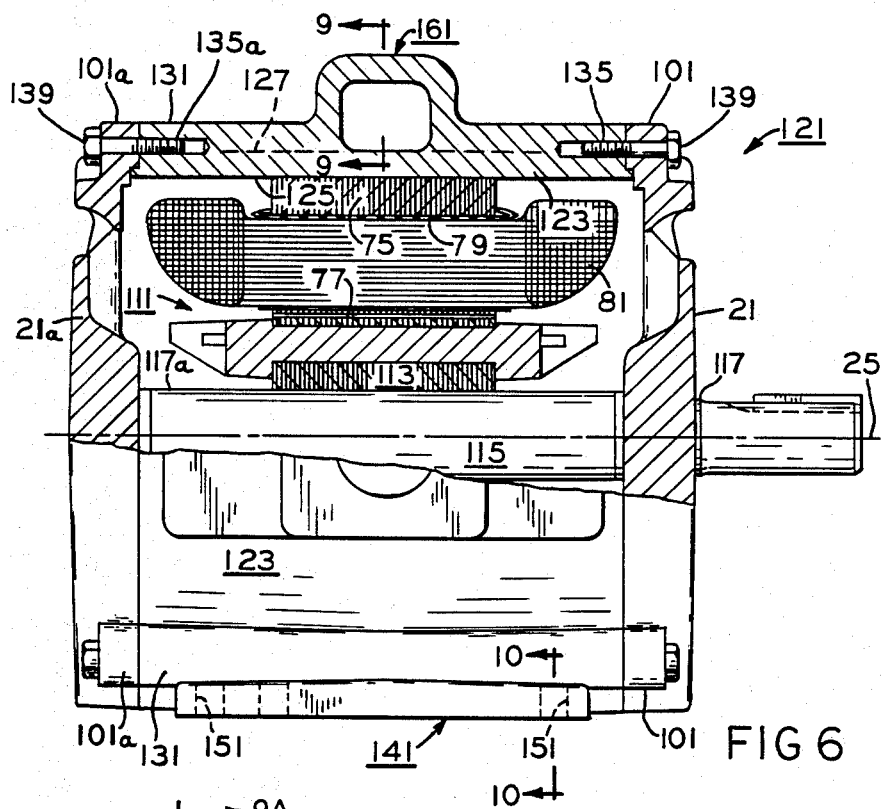
FIG. 6 is a partial sectional view showing an alternative dynamoelectric machine in one form of the invention partially in cross-section.
Figure 7:
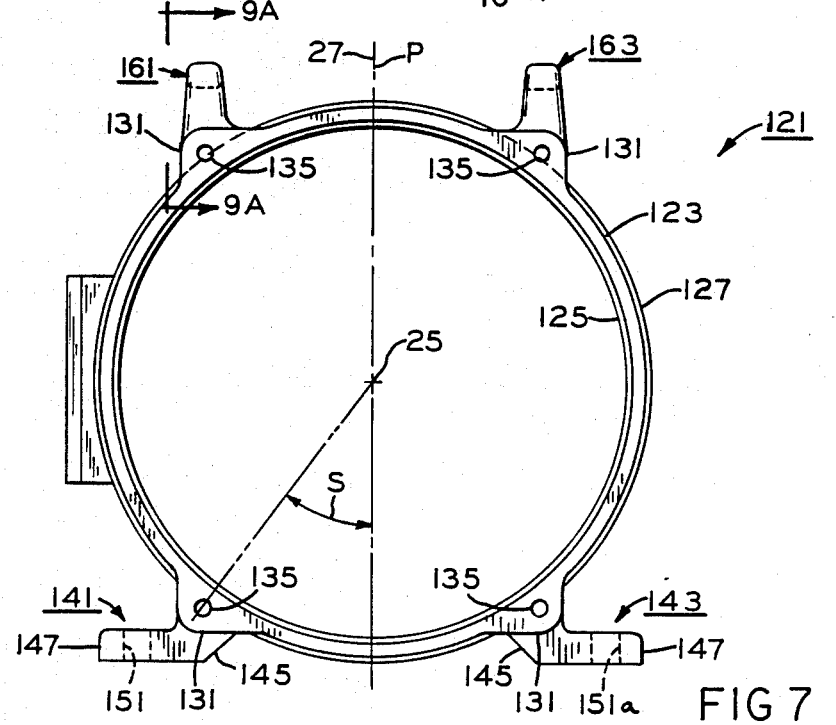
FIG. 7 is a right side elevational view of the alternative dynamoelectric machine in FIG. 6 with one of the end frames removed.

As illustrated in FIGS. 6 and 7, electric motor 121 has a housing 123 which may be cast of any suitable metallic material having the desired physical properties, such as for instance a cast steel or cast iron or the like, and inner and outer circumferential surfaces 125, 127 of the housing are predeterminately spaced about horizontal centerline axis 25 with imaginary plane P passing therethrough to define vertical axis 27 of the electric motor. A pair of opposite end faces 129, 129a are provided on housing 123 between inner and outer circumferential surfaces 125, 127 thereof, and external rabbets 19, 19a are machined in the outer circumferential surface generally in the same manner as previously discussed. Four mounting flanges 131 are integrally cast with housing 123 so as to extend generally axially between opposite end faces 129, 129a and protrude generally radially beyond outer circumferential surface 127 of the housing. As best seen in FIG. 8, each mounting flange 131 as a pair of opposed ends or end faces 133, 133a arranged generally in coplanar relation with opposite annular sidewalls 87, 87a of external rabbets 19, 19a and also a pair of opposite apertures or threaded openings 135, 135a axially aligned about a horizontal centerline axis 137 and intersecting with opposite end faces 133, 133a, respectively. It may be noted that the centerline axis 137 of each threaded opening is angularly or radially spaced about horizontal centerline axis 25 of electric motor 121 so as to be predeterminately located generally about thirty seven and one-half degrees (37° 30′) from vertical axis 27 thereof, as indicated by angle S in FIG. 7 and as further discussed hereinafter.

As best seen in FIG. 8, base walls 83, 83a of external rabbets 19, 19a are radially disposed between inner and outer circumferential surfaces 125, 127 of housing 123 intersecting opposite end faces 129, 129a thereof, and sidewalls 87, 87a of the external rabbets extend generally radially between the base walls and the outer circumferential surface, respectively; however, as previously mentioned, the sidewalls are also generally coplanar with opposite ends 133, 133a of mounting flanges 131. For the purpose of drawing simplification, external rabbets 19, 19a opposite end frames 21, 21a and mounting flanges 131 are compositely shown in FIG. 8.

When opposite end frames 21, 21a are assembled with housing 123, annular base walls 87, 87a of internal rabbets 95, 95a on the opposite end frames are placed in overlaying engagement about annular base walls 83, 83a of opposite external rabbets 19, 19a on the housing, and opposite end faces 89, 89a on the end frames are engaged with external rabbet sidewalls 87, 87a of the housing while opposite sidewalls 99, 99a on the end frames are disposed at least adjacent end faces 129, 129a of the housing, respectively. With internal rabbets 95, 95a of opposite end frames 21, 21a so seated in engagement about external rabbets 19, 19a on housing 123, the ed frames may be adjustably rotated into preselected assembly positions thereof on the housing thereby to axially align centerline axes 105, 105a of openings 103, 103a in mounting lugs 101, 101a with centerline axes 137 of threaded openings 135, 135a of mounting flanges 131, respectively. When opposite end frames 21, 21a are so located in their preselected assembly positions on housing 13, a plurality of threaded bolts 139 may be passed through openings 103, 103a in mounting lugs 101, 101a into threaded engagement with threaded openings 135, 135a in mounting flange 131 thereby to releasably retain the end frames against displacement from the preselected assembly positions thereof on housing 123. It may be noted that mounting lugs 101, 101a on end frames 21, 21a and mounting flanges 131 on housing 123 have generally the same cross-sectional configuration, and it may be further noted that the end frames are interchangeable for use with both electric motor 11 and electric motor 121.

The peripheral surface on core 75 of stator assembly 73 is press-fitted into displacement preventing engagement with inner circumferential surface 125 of housing 123 generally in the same manner previously discussed, and albeit not shown for purposes of brevity of disclosure and drawing simplification, the leads of winding means 81 may be passed through an opening in housing 123 into a conduit box (not shown) secured thereto in a manner well known to the art. Even through the press-fit of stator assembly 73 into housing 123, as mentioned above, will not appreciably distort the housing, it is believed that external rabbets 19, 19a are necessarily provided in the housing for concentricity purposes since the housing is of a cast metallic material. Furthermore, since opposite end frames 21, 21a are interchangeable between electric motors 11 and 121, as previously mentioned, opposite shaft extensions 117, 117a of rotatable assembly 111 are rotatably supported by the end frames so as to generally coaxially arrange rotor 113 at least in part within bore 77 in core 75 of stator assembly 73.

Housing 123 is also integrally provided with a pair of opposite mounting pads or feet 141, 143 generally axially disposed between opposite end faces 129, 129a of the housing, and the opposite mounting pads are adapted to mount or seat electric motor 121 on support 49 therefor. Opposite mounting pads 141, 143 extend from adjacent mounting flanges 131 generally in oppositely spaced perpendicular relation with vertical axis 27, as best seen in FIG. 7, and for the purpose of drawing simplification the opposite mounting pads are compositely shown in FIG. 10. Each opposite mounting pad 141, 143 has a part, such as a leg 145 for instance, which is blended in shape with adjacent mounting flanges 131 and a free end or free end part 147 generally opposite leg or blended part 145. A base or mounting surface 149 is provided on each opposite mounting pad 141, 143 for seating engagement on the aforementioned support 49 for electric motor 121, and a set or arrays of spaced apart openings 151, 151a extend through each opposite mounting pad intersecting with the base surface thereof for receiving standard mounting bolts 153 which are adapted for releasable securement with such support to releasably secure the electric motor thereto. Each of openings 151, 151a have a generally vertical centerline axis 155 spaced apart by the aforementioned NEMA standard A and B mounting dimensions and arranged generally in parallel spaced apart relation from vertical axis 27, and the centerline axes 155 intersect with outer circumferential surface 127 of housing 123, respectively. Mounting pads 141, 143 are compositely shown in FIG. 10, and albeit not shown for the purpose of drawing simplification, it is contemplated that such pads may be provided with the previously discussed different arrays of bolt-holes respectively spaced apart in the standard A and B dimensions with such bolt-holes being predeterminately oversized to accommodate both the NEMA and IEC standardized mounting dimensions.

It may be noted that the blending of legs 145 of each opposite mounting pad 141, 143 in shape with adjacent mounting flanges 131 not only minimize material utilized in both the adjacent mounting flanges and the opposite mounting pads but also provides adequate space for the insertion of standard mounting bolts 153 into openings 151, 151a therefor (which may be predeterminately oversized as previously discussed) in the opposite mounting pads without interfering engagement of the standard mounting bolts with the adjacent mounting flanges on housing 123, as illustrated in dotted outline in FIG. 7. Furthermore, it may also be noted that the preselected location or arrangement of opposite threaded openings 135, 135a in mounting flanges 131 so as to be radially spaced generally about horizontal centerline axis 25 generally about thirty seven and one half degrees (37° 30') from vertical axis 27 is effective not only to permit the blending in shape of legs 145 of each opposite mounting pad 141, 143 with adjacent mounting flanges 131 but also to predeterminately locate the adjacent mounting flanges in positions obviating interfering engagement thereof with standard mounting bolts 153 when the mounting bolts are inserted into openings 151, 151a therefore in opposite mounting pads 141, 143, respectively.

It may also be noted that portions of opposite mounting pads 141, 143 may be planed or milled away in order to change the shaft height dimension of electric motor 121 as measured between horizontal centerline axis 25 and base line reference or support 49 of the electric motor.

A pair of lifting lugs 161, 163 are integrally provided on housing 123 and extend from adjacent upper mounting flanges 131 generally in oppositely spaced parallel relation with vertical axis 27, respectively, as best seen in FIG. 2 and for purpose of drawing simplification, the lifting lugs are compositely shown in FIG. 9. Each lifting lug 161, 163 includes a pair of axially spaced apart parts, such as legs 165, 165a for instance, which are blended in shape with adjacent upper mounting flanges 131 and a lifting opening 167 extends through each lifting lug between the legs or blended parts 165, 165a and a free end or free end part 169 integrally joined between the legs. Thus, it may be noted that the blending of legs 165, 165a in shape with adjacent upper mounting flanges minimizes material utilized in both the adjacent upper mounting flanges and lifting lugs 161, 163.

From the foregoing, it is now apparent that novel electric motors 11, 121 have been presented meeting they objects set out hereinbefore, and it is contemplated that changes as to the arrangements, shapes, connections and other details of the construction illustrated herein for purposes of disclosure may be made by those having ordinary skill in the art without departing from the spirit of the invention or from the scope of the invention as defined by the claims which follow.

What we claim as new and desire to secure by Letters Patent of the United States is:

1. A dynamoelectric machine adapted for energization comprising:

a housing having a horizontal centerline axis with an imaginary plane passing therethrough to define a vertical axis of the dynamoelectric machine, said housing including generally axially extending radially spaced apart first inner and outer circumferential surfaces generally coaxial with the horizontal centerline axis, at least one end face extending generally radially between said first inner and outer circumferential surfaces, and at least one circumferential external rabbet in said first outer circumferential surface having a generally annular first base wall intersecting said at least one end face and a generally annular first sidewall intersecting said first base wall and said first outer circumferential surface;

a stator assembly disposed within said first inner circumferential surface and axially spaced from said at least one end face, said stator assembly including winding means for excitation upon the energization of the dynamoelectric machine;

rotatable means extending generally coaxially through said stator assembly for magnetic coupling relation with said winding means upon the excitation thereof;

at least one end frame means disposed in a preselected assembly position on said housing for rotatably supporting a part of said rotatable means, said at least one end frame means including generally axially extending radially spaced apart second inner and outer circumferential surfaces, another end face extending generally radially between said second inner and outer circumferential surfaces, a circumferential internal rabbet in said second inner circumferential surface having a generally annular second base wall intersecting said another end face and a generally annular second sidewall intersecting said second base wall and said second inner circumferential surface, said second base wall being received in engagement about said first base wall, said another end face being disposed in facing relation at least adjacent said first sidewall and said second sidewall being disposed in facing relation at least adjacent said at least one end face when said at least one end frame means is in its preselected assembly position on said housing, four flanges integral with said second outer circumferential surface and extending generally radially therefrom, and each flanges having an aperture therein with a centerline axis radially spaced about the horizontal centerline axis generally about thirty seven and one half degrees (37° 30') from the vertical axis when said at least one end frame is in the preselected assembly position thereof;

said housing further including another four flanges integral with said first outer circumferential surface, said another four flanges each having a threaded aperture coaxial with another centerline axis and each another centerline axis being radially spaced about the horizontal centerline axis generally about thirty seven and one half degrees (37° 30') from the Vertical axis so as to generally axially align with a respective one of said first named apertures when said at least one end frame means is in its preselected assembly position; a pair of mounting pads integrally formed with two adjacent ones of said another four flanges and extending therefrom generally in oppositely spaced relation with the vertical axis, respectively, each mounting pad including a part blended in shape with one of said two adjacent ones of said another four flanges, a free end part, and at least one opening spaced between said blended part and said free end part with said at least one opening having a third centerline axis arranged generally in predetermined spaced parallel relation with the vertical axis so as to intersect with said first outer circumferential surface; and a set of means extending at least in part through said first named and threaded apertures for threaded interconnection with said threaded apertures, respectively, to releasably maintain said at least one end frame against displacement from its preselected assembly position.

2. A dynamoelectric machine adapted for enegization comprising:

a housing having a horizontal centerline axis with an imaginary plane passing therethrough to define a vertical axis of the dynamoelectric machine, said housing including generally axially extending radially spaced apart first inner and outer circumferential surfaces generally coaxial with the horizontal centerline axis, at least one end face extending generally radially between said first inner and outer circumferential surfaces, and at least one circumferential external rabbet in said first outer circumferential surface having a generally annular first base wall intersecting said at least one end face and a generally annular first sidewall intersecting said first base wall and said first outer circumferential surface;

a stator assembly disposed within said first inner circumferential surface and axially spaced from said at least one end face, said stator assembly including winding means for excitation upon the energization of the dynamoelectric machine;

rotatable means extending generally coaxially through said stator assembly for magnetic coupling relation with said winding means upon the excitation thereof;

at least one end frame means disposed in a preselected assembly position on said housing for rotatably supporting a part of said rotatable manner, said at least one end frame means including generally axially extending radially spaced apart second inner and outer circumferential surfaces, another end face extending generally radially between said second inner and outer circumferential surfaces, a circumferential internal rabbet in said second inner circumferential surface having a generally annular second base wall intersecting said another end face and a generally annular second sidewall intersecting said second base wall and said second inner circumferential surface, said second base wall being received in engagement about said first base wall, said another end face being disposed in facing relation at least adjacent said first sidewall and said second sidewall being disposed in facing relation at least adjacent said at least one end face when said at least one end frame means is in its preselected assembly position on said housing, four flanges integral with said second outer circumferential surface and extending generally radially therefrom, and each flange having an aperture therein with a centerline axis radially spaced about the horizontal centerline axis generally about thirty seven and one half degrees (37° 30') from the vertical axis when said at least one end frame is in the preselected assembly position thereof;

said first outer circumferential surface including another four flanges integral with said first outer circumferential surface, said another four flanges each having a threaded aperture coaxial with another centerline axis and each another centerline axis being radially spaced about the horizontal centerline axis generally about thirty seven and one half degrees (37° 30') from the vertical axis so as to generally axially align with a respective one of said first names apertures when said at least one end frame means is in its preselected assembly position;

a set of means extending at least in part through said first named and threaded apertures for threaded interconnection with said threaded apertures, respectively, to releasably maintain said at least one end frame against displacement from its preselected assembly position; and a pair of lifting lugs integral with adjacent ones of said another four flanges and extending generally in parallel relation with the vertical axis, respectively, each lifting lug including a pair of legs in part blended in shape with one of said adjacent ones of said another four flanges.

3. A dynamoelectric machine comprising:

a housing having a horizontal centerline axis with an imaginary vertical plane passing through the horizontal centerline axis to define a vertical axis of said housing;

generally axially extending radially spaced apart inner and outer circumferential surfaces on said housing and generally coaxial with the horizontal centerline axis;

a pair of generally opposite end faces on said housing between said inner and outer circumferential surfaces;

said outer circumferential surface including at least four flanges extending generally axially between said opposite end faces, each of said at least four flanges having a pair of generally axial opposite apertures, and each opposite aperture having another centerline axis radially spaced about the horizontal centerline axis generally about thirty seven and one half degrees (37° 30') from the vertical axis; and a pair of mounting pads integral with two adjacent ones of said at least four flanges and extending generally in oppositely spaced relation with respect to the vertical axis, respectively, each mounting pad including a part blended in shape with one of said two adjacent ones of said at least four flanges, and a free end part extending from said first named part generally perpendicular to the vertical axis;

4. The dynamoelectric machine as set forth in claim 3 further comprising a pair of lifting lugs integral with another two adjacent ones of said at least four flanges, each lifting lug including a pair of spaced apart legs with each leg having a part blended in shape with a respective one of said another two adjacent ones of said at least four flanges.

5. The dynamoelectric machine as set forth in claim 4 wherein said each lifting lug further includes a free end connected between said legs.

6. The dynamoelectric machine as set forth in claim 3 wherein said each mounting pad further includes at least one array of bolt-holes with each bolt-hole being spaced between said blended part and said free end.

7. A dynamoelectric machine comprising:

a housing having a horizontal centerline axis with an imaginary vertical plane passing through the horizontal centerline axis to define a vertical axis of said housing;

generally axially extending radially spaced apart inner and outer circumferential surfaces on said housing and generally coaxial with the horizontal centerline axis;

a pair of generally opposite end faces on said housing between said inner and outer circumferential surfaces;

said outer circumferential surface including at least four flanges extending generally axially between said opposite end faces, each of said at least four flanges having a pair of generally axial opposite apertures, and each opposite aperture having another centerline axis radially spaced about the horizontal centerline axis generally about thirty seven and one half degrees (37° 30') from vertical axis; and a pair of lugs integral with two adjacent ones of said at least four flanges and extending generally in oppositely spaced parallel relation with the vertical axis, respectively, each lifting lug including a pair of legs with each leg having a part blended in shape with one of said two adjacent ones of said at least flanges, a free end part extending beyond an intersection of the vertical axis with said outer circumferential surface and connected between said legs, and a lifting opening between said legs and said free end part.

8. A dynamoelectric machine comprising:

a housing having a centerline axis with an imaginary plane passing through the centerline axis to define a second axis of said housing generally perpendicular to the centerline axis, said housing including generally axially extending radially spaced apart inner and outer circumferential surfaces disposed generally coaxially about the centerline axis, a pair of first opposite end faces intersecting said inner and outer circumferential surfaces, respectively, a set of flanges integrally formed with said outer circumferential surface so as to extend generally radially therebeyond and generally axially between said first opposite end faces, respectively, each flange having a pair of generally opposite threaded apertures, and each threaded aperture having another centerline axis radially spaced about the first named centerline axis generally about thirty seven and one half degrees (37° 30') from the second axis;

a pair of generally opposite end frames arranged in preselected assembly positions on said housing, said opposite end frames including a pair of second end faces disposed at least in part in mating engagement with at least said first opposite end faces, and a pair of sets of other apertures generally axially aligned with said opposite threaded apertures when said opposite end frames are in the preselected assembly positions thereof, respectively; and a pair of sets of means extending through said other apertures in said opposite end frames for threaded engagement with said opposite threaded apertures in said flanges to retain said opposite end frames against displacement from the preselected assembly positions thereof, respectively.

9. The dynamoelectric machine as set forth in claim 8 wherein said housing further includes a pair of generally opposite external rabbets each intersecting said outer circumferential surface and one of said opposite end faces.

10. The dynamoelectric machine as set forth in claim 9 wherein said second end faces include a pair of internal rabbets disposed at least in part in the mating engagement with said opposite external rabbets, respectively.

11. The dynamoelectric machine as set forth in claim 9 wherein each opposite external rabbet includes at least one generally annular surface intersecting with at least said outer circumferential surface.

12. The dynamoelectric machine as set forth in claim 11 wherein said flanges each include a pair of opposite end surfaces arranged generally in coplanar relation with said at least one annular surfaces of said opposite external rabbets, said opposite threaded apertures extending through said opposite end surfaces, respectively.

13. The dynamoelectric machine as set forth in claim 8 wherein said opposite end frames include a pair of sets of other flanges arranged at least in part at least adjacent said first named opposite flanges when said opposite end frames are in the preselected assembly positions thereof, said other apertures extending through said other flanges on said end frames, respectively.

14. The dynamoelectric machine as set forth in claim 8 wherein said housing further includes a pair of lifting lugs integral with two adjacent flanges and disposed in spaced relation from the second axis, respectively, each lifting lug including a pair of spaced apart legs with each leg having a part blended in shape with one of said two adjacent flanges, and an end part interconnected between said legs.

15. The dynamoelectric machine as set forth in claim 8 wherein said housing further includes a pair of generally opposite mounting pads integral with two adjacent flanges, said mounting pads each having a part blended in shape with one of said two adjacent flanges, and another part integral with said first named part and extending in a direction generally perpendicularly from the second axis.

* * * * *